United States Patent [19]

Hughes

[11] 4,015,784

[45] Apr. 5, 1977

[54] EMULSIFIER FOR SAUSAGE BATTER AND THE LIKE

[76] Inventor: Alvin W. Hughes, 4N 194 Church St., Bensenville, Ill. 60106

[22] Filed: Feb. 5, 1976

[21] Appl. No.: 655,626

[52] U.S. Cl. ............................. 241/162; 241/248; 241/257 R

[51] Int. Cl.² ........................................ B02C 19/12

[58] Field of Search ........... 241/162, 186 R, 188 R, 241/248, 257 R

[56] References Cited

UNITED STATES PATENTS

| | | | |
|---|---|---|---|
| 3,123,116 | 3/1964 | Hughes | 241/86.1 |
| 3,221,788 | 12/1965 | Hughes | 241/248 |
| 3,478,797 | 11/1969 | Hughes | 241/257 |
| 3,575,224 | 4/1971 | Hughes | 241/186 |

Primary Examiner—Granville Y. Custer, Jr.
Attorney, Agent, or Firm—Leydig, Voit, Osann, Mayer & Holt, Ltd.

[57] ABSTRACT

Apparatus for emulsifying sausage batter and the like wherein sausage batter to be emulsified is first gravity fed from a hopper into the inlet of a comminuting chamber. The batter is then impelled radially outwardly into a rotating centrifugal trap which is adapted to centrifugally remove impurities such as metal particles and to direct the material downwardly through a series of alternately rotatable and non-rotatable perforate rings. The interaction of the rings comminutes and emulsifies the batter as it passes therethrough, whereupon it exits vertically from the lowermost of a series of rings and is swept by rotating blades into a tangentially disposed discharge conduit.

4 Claims, 3 Drawing Figures

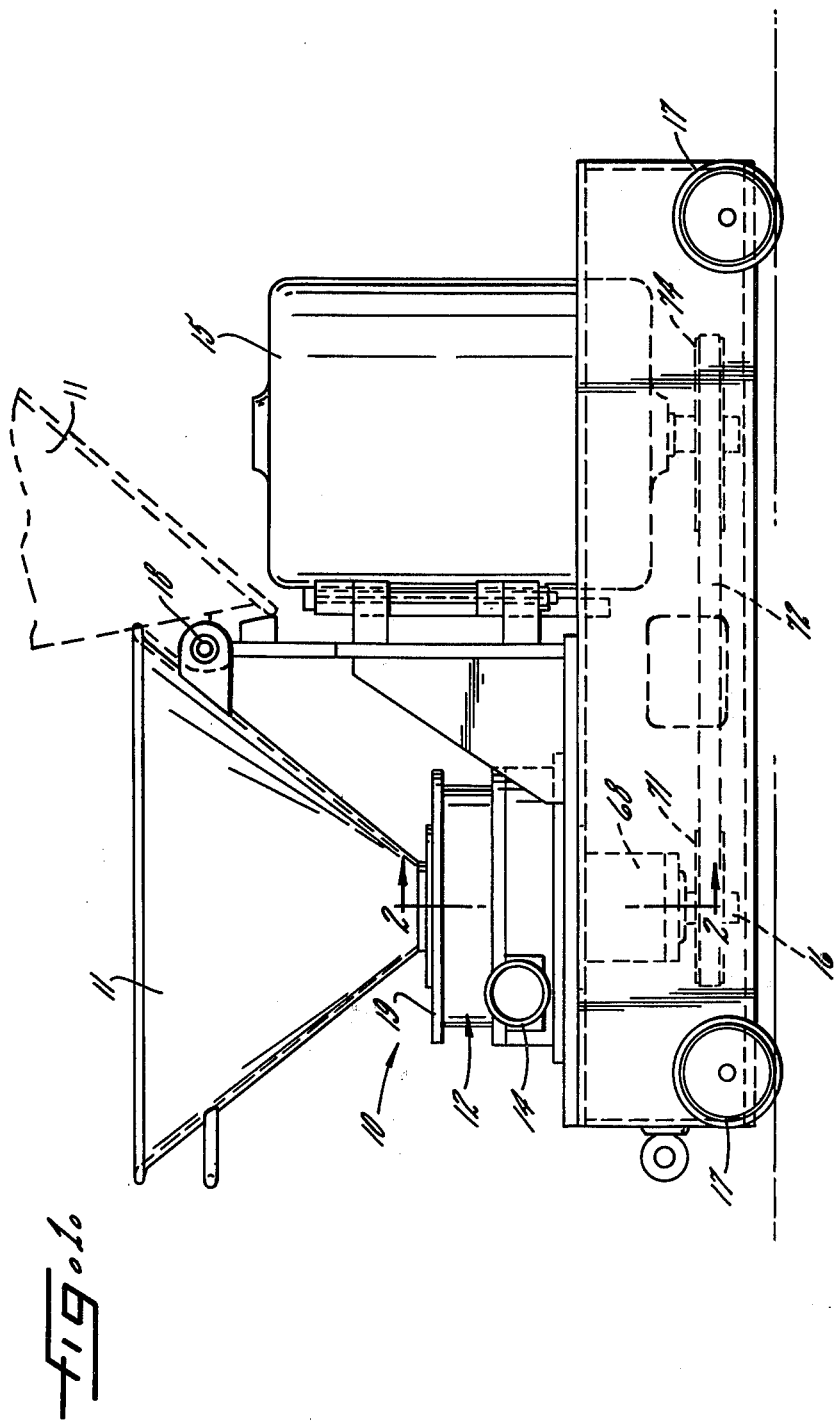

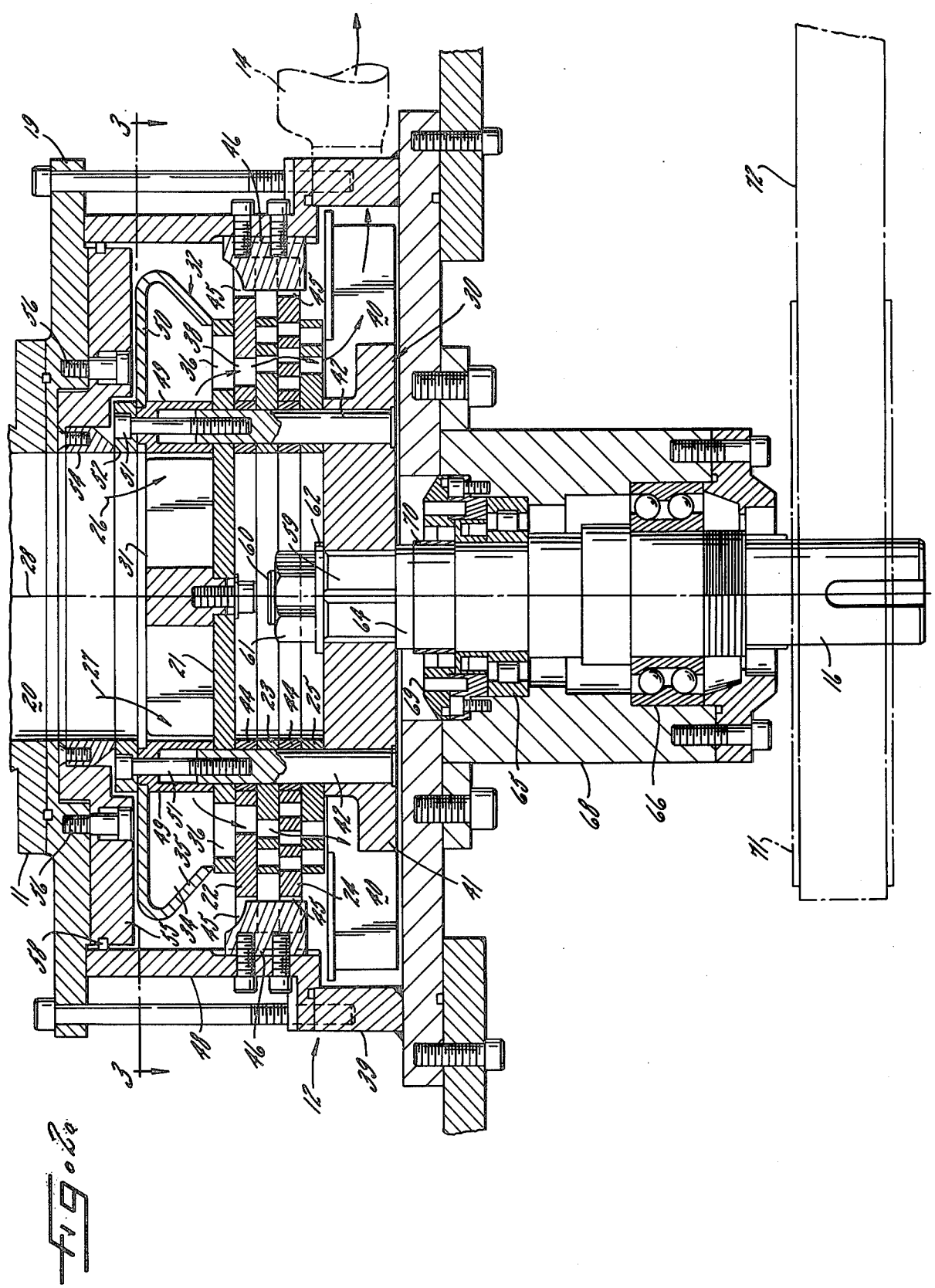

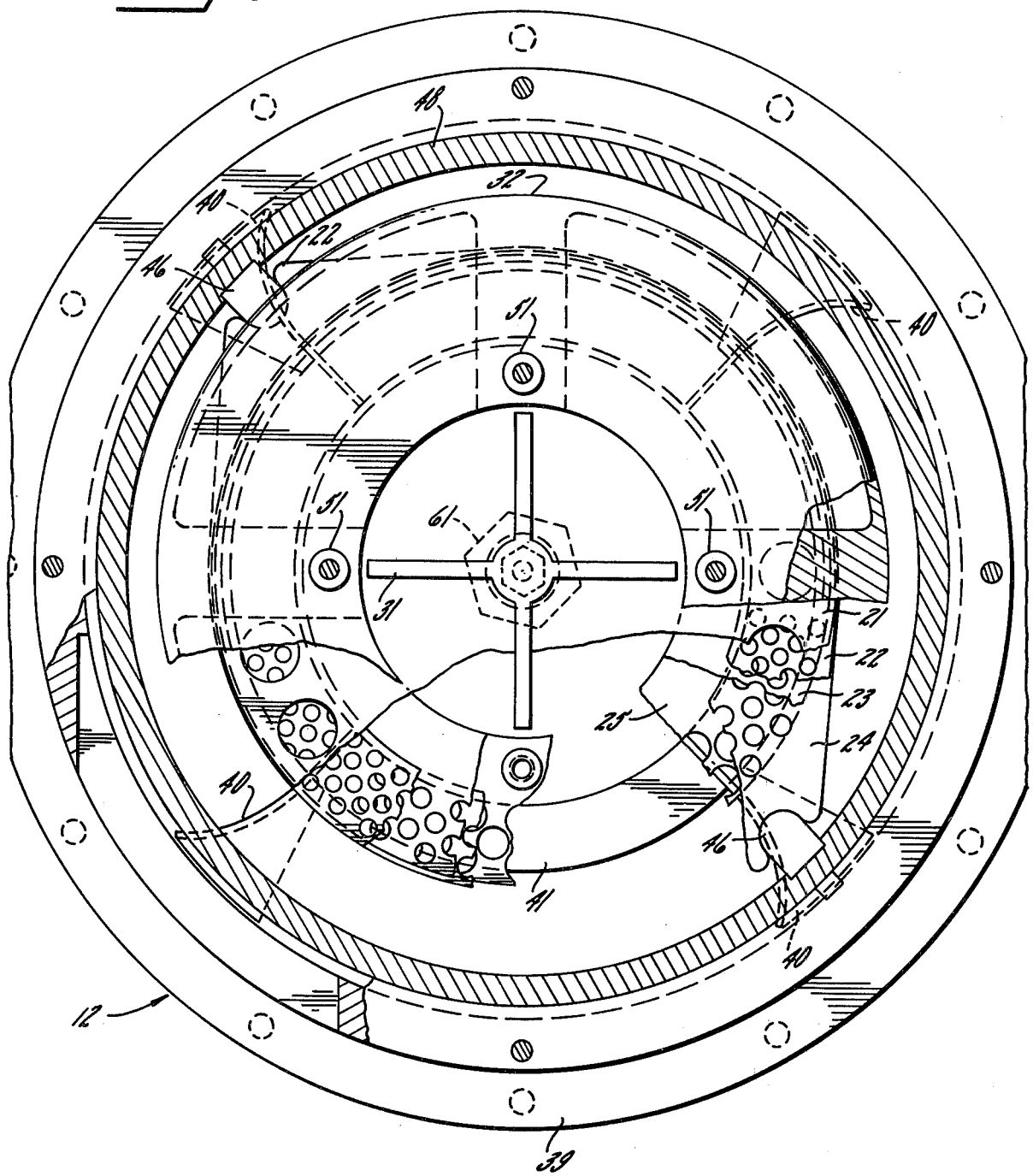

EMULSIFIER FOR SAUSAGE BATTER AND THE LIKE

DESCRIPTION OF THE INVENTION

The present invention relates generally to emulsifying apparatus and, more particularly, to an improved emulsifier for sausage batter and the like. In its principal aspect, the invention is concerned with emulsifying sausage batter in a highly efficient manner and improving the characteristics and stability of finished emulsions.

Moreover, a stable product is not overly sensitive to the cooking cycle heat, making possible a finished product which is less likely to "oil out" during the cooking cycle causing product loss, production delay and costly reworking of an unsalable product.

Reworking a product such as sliced bologna costs a manufacturer a considerable amount per pound. This cost develops as a result of too much handling and rehandling; inspection discards because of jelly pockets (honeycomb effect); and air pockets. Air pockets can be developed in the product because of air leakage into process equipment. Jelly pockets are usually formed during the cooking cycle due to a lowered stability usually caused by input of excessive mechanical heat and by agitation, turbulence, and compression during emulsification.

The emulsifier according to the present invention is of the general type described in U.S. Pat. No. 3,123,116 issued Mar. 3, 1964 as improved by subsequently issued U.S. Pat. Nos. 3,221,788 issued Dec. 7, 1965 and 3,318,353 issued May 9, 1967, all to Alvin W. Hughes. Further improvements in this type of emulsifier are set forth in two patents on combination emulsifying and deaerating apparatus: U.S. Pat. Nos. 3,334,674 issued Aug. 8, 1967 and 3,575,224 issued Apr. 20, 1971, both to Alvin W. Hughes. In the evolution of the emulsifier set forth in the patents enumerated above, there has been a continued effort to reduce the frictional heat input to the product and also to increase the efficiency of the emulsifier. Minimal frictional heat input as indicated is a desired goal since heat generated during the emulsification tends to reduce the stability of the sausage emulsion, resulting in, among other things, an oily product less desirable to the consumer. The achievement of higher efficiency is related to the minimization of heat input. This is because the undesirable heat input to the product represents energy dissipation, which in turn corresponds to a decrease in efficiency. As has been explained in the above-enumerated patents, the friction within the alternately rotatable and non-rotatable perforate ring emulsifying apparatus of the type therein and herein disclosed is greatly reduced by the "floatation" of the non-rotatable rings between the rotatable rings. The result is the reduction of direct frictional contact between the two sets of rings. Notwithstanding this feature, it is desirable to further reduce the friction and other sources of heat input to the sausage batter.

It is believed by applicant that a major source of heat input to the sausage batter in the emulsifiers heretofore known are radial passages which serve to impel the sausage batter horizontally away from the last of the rotating rings onto either a non-rotatable annular discharge chamber (U.S. Pat. Nos. 3,123,116, 3,221,788, 3,318,353 and 3,337,674) or onto a rotating attenuator (U.S. Pat. No. 3,575,224). It is also believed that the combination of the frictional contact between the material and the radial passages and the dissipation of the kinetic energy of the material upon contacting either a discharge chamber or an attenuator generate significant amounts of heat which, as explained above, may impair the quality of the product and reduce the efficiency of the apparatus. An additional source of heat is believed to be the indirect path followed by the batter in passing through known apparatus, with the excess travel of the batter resulting in additional frictional losses.

It is therefore the primary object of the present invention to provide an emulsifier having a low heat input to the sausage batter and, as a related consequence, having an improved efficiency.

A more specific object is to reduce the heat input and to increase the efficiency of an emulsifier by reducing the frictional losses within the apparatus.

Still another object is to provide an emulsifier having a minimum of abrupt changes in the flow path through the emulsifier.

A closely related object of the present invention is to provide an emulsifier through which the batter passes in a more direct route than with known emulsifiers.

These and other objects will be apparent as the following description proceeds, taken in conjunction with the following drawings in which:

FIG. 1 is an elevational view of an exemplary embodiment of an emulsifying apparatus incorporating the features of the present invention;

FIG. 2 is a sectional view taken along line 2—2 in FIG. 1 illustrating the details of the emulsifier and the path of the material through the emulsifier; and FIG. 3 is a sectional view primarily of the rotational elements taken along line 3—3 in FIG. 2 and having various components broken away to illustrate the configuration of the several components.

While the invention is susceptible of various modifications and alternative forms, a specific embodiment thereof has been shown by way of example in the drawings and will herein be described in detail. It should be understood, however, that it is not intended to limit the invention to particular forms disclosed, but, on the contrary, the intention is to cover all modifications, equivalents and alternatives falling within the spirit and scope of the invention.

Turning now to the drawings, and particularly to FIG. 1, there is illustrated an exemplary emulsifying apparatus, generally indicated at 10, particularly suited for emulsifying sausage batter. Incoming batter is directed from a conical hopper 11 into the axial inlet of the cylindrical emulsifying chamber 12. As will hereinafter be described in detail, the sausage batter is comminuted and emulsified while passing through the emulsifying chamber 12, whereupon it exits through a discharge conduit 14. Power for the apparatus is supplied by a motor 15 which, through a belt and pulley arrangement, drives the input shaft 16 of the emulsifying chamber. The apparatus is mounted on wheels 17 to enhance the mobility of the unit. Access to the internal components of the emulsifying chamber for the maintenance and cleaning thereof is achieved by pivoting the hopper 11 about a pin 18 into the position indicated by the dotted lines in FIG. 1. As will be clear from the detailed discussion which follows, with the hopper 11 in the position indicated by the dotted lines, the emulsifying chamber cover plate 19 may be removed to provide ready access to the internal components of the emulsifying chamber 12.

The general function and mode of operation of the emulsifying chamber 12 is similar to that disclosed and claimed in the above-referenced patents to Alvin W. Hughes, particularly U.S. Pat. No. 3,575,224. Within the emulsifying chamber sausage batter is directed through holes in a series of alternately rotatable and non-rotatable rings whereupon a very large number of cutting operations are performed on the batter. The emulsifying chamber according to the present invention differs from the emulsifying chamber set forth in U.S. Pat. No. 3,575,224 and the four other patents in several significant ways, however, with the most readily observable differences being in the path through which the sausage batter travels in passing through the emulsifying chamber.

Referring to FIG. 2, upon entering the emulsifying chamber 12 from the hopper 11 (supra) the sausage batter flows downward through an axial inlet 20, radially outward, downward through each of the perforate rings 21–25, and exits from the emulsifier through a horizontal tangentially disposed discharge conduit 14. The lines 26 and 27 indicate the general flow path. It should be recognized that in an aspect of the flow not illustrated by FIG. 2, the sausage batter rotates about the axis 28 of the emulsifying chamber. The flow of the batter through the emulsifying chamber of the present invention should be contrasted with the flow of the above-referenced patents.

In U.S. Pat. Nos. 3,123,116 and 3,221,788 the sausage batter flows downward through an axial inlet, radially outward, and then either upward or downward through one non-rotatable perforate ring. The sausage batter is then discharged radially by rotatable, radially slotted discharge rings against a stationary annular wall, e.g., items 37 and 12, respectively, in U.S. Pat. No. 3,123,116. The emulsified sausage batter then flows downward along the annular wall whereupon it is swept by rotating blades through a horizontal tangentially disposed discharge conduit, e.g., items 21 and 22, respectively, in U.S. Pat. No. 3,123,116.

In U.S. Pat. Nos. 3,318,353, 3,334,674 and 3,575,224 the sausage batter flows downward through an axial inlet, radially outward and then upward through each of the perforate rings. As was the case in the two above-referenced patents, the sausage batter is then discharged radially by a rotatable, radially slotted discharge ring against an annular wall, e.g., items 60 and 12E, respectively in U.S. Pat. No. 3,318,353.

Comparing the flow of sausage batter through the present invention with the flows through the emulsifiers disclosed in the five prior patents, it should be noted that there is no upward travel of the sausage batter. Nor is there a radial discharge of the emulsified batter against an annular wall, whether it be stationary or a rotating attenuator. As explained above, it is believed that these differences reduce the friction and the dissipation of kinetic energy, two heat-generating phenomena.

Referring now to FIGS. 2 and 3 for a detailed description of the emulsifying chamber, a rotor assembly, generally indicated at 30 serves the functions of feeding the material, emulsifying it and discharging it from the chamber. Sausage batter from the hopper flows by gravity vertically downward through the axial inlet 20 to the emulsifying chamber 12. An impeller 31 at the top of the rotor assembly directs the batter radially outward toward a feed ring 32. The radially flowing batter from the feed impeller enters the peripheral chamber 34 of the feed ring and impinges the inwardly sloping sides 35 thereof, whereupon the higher density impurities such as bone chips and staple or wire segments are circumferentially entrained, with the remainder of the batter being directed downwardly into the openings 36 of a first rotatable perforate ring 21. The batter flows through the first rotatable perforate ring 21 and into the openings 38 of a first non-rotatable perforate ring 22. In a similar manner, the batter continues downward through a second rotatable perforate ring 23, a second non-perforate rotatable perforate ring 24 and finally through a third rotatable perforate ring 25, whereupon it discharges vertically downwardly into the drive disk housing 39. The rotating blades 40 of the drive disk 41 direct the batter from the emulsifying chamber into a horizontal tangentially disposed discharge conduit 14.

Four pins 42 extending upwardly from the drive disk 41 serve to align the rotating rings 21–25 and to impart rotational movement thereto. For the purpose of maintaining spacing between the three rotatable rings 21, 23 and 25 to accommodate the two non-rotatable rings 22 and 24, a spacer ring 44 is interposed between each rotatable ring. The non-rotatable rings 22 and 24 are annular, having notches 45 in their peripheries to accommodate retainer blocks 46. The retainer blocks 46 are secured to the ring housing 48 and prevent the rotation of the rings 22 and 24 while permitting the axial movement thereof. The inside diameters of the non-rotatable rings 22 and 24 are slightly greater than the outside diameters of the spacer rings 44 to permit relative movement therebetween. As explained in U.S. Pat. No. 3,123,116, the thickness of the spacer rings 44 is slightly greater than the thickness of the non-rotatable rings 22 and 24. During operation the non-rotatable rings 22 and 24 "float" between the superjacent and subjacent rotatable rings to greatly reduce the friction between the various rings. This not only reduces the heat-generating friction but also reduces wear and serves to minimize the quantity of metal due to wear introduced into the batter as it passes through the emulsifier. While the optimum sizing may vary from application to application, a spacer ring/non-rotatable ring thickness differential of between 0.002 and 0.003 inches has been found to give satisfactory results.

Four feed ring spacers 49 slip over the top of each pin 42 and serve to support and align the feed ring 32, as well as to impart rotational movement thereto. In order to support the upper surface 50 of the feed ring 32, the upper ends of the feed ring spacers are shouldered, with the shoulders serving to support the feed ring.

The feed ring spacers 49 are bored out for a substantial portion of their length to accept the pins 42 extending through the upper rotatable ring 21. The telescoping feed ring spacer/pin arrangement has the advantage of relaxing the tolerance on the position of the upper ends of the pins 42 with respect to the top surface of the upper rotatable ring 21. The pins 42 cooperate properly with the spacers 49 to maintain the integrity of the rotor assembly so long as the upper ends of the pins extend through the top surface of the upper rotatable ring, but do not extend above said surface so far that they prevent the seating of the spacers 49 and feed ring 32 on the upper perforate ring 21. As a result, the perforate rings 21–25 and the spacer rings 44 may be reground as required until the maximum permissible extension of the pins 42 beyond the top surface of the upper perforate ring 21 is exceeded, at which time the rings must be either replaced with thicker rings or supplemented with additional rings.

The rotor assembly 30 is tied together by four cap screws 51. The cap screws 51 also secure a seal companion ring 52 in position immediately above and concentric with the opening in the feed ring 32. This seal companion ring 52 cooperates with the stationary annular seal 54 to confine the sausage batter to the flow path. The annular seal 54 is mounted within a seal housing 55 which is free to move axially as required to maintain a seal between the annular seal 54 and the seal companion ring 52. The freedom of movement of the seal housing 55 is provided by shouldered cap screws 56 which pass through clearance holes in the seal housing 55 and seat against the emulsifying chamber cover plate 19. The seal housing 55 is counterbored to accommodate the head of the shouldered cap screws 56 as the seal housing moves relative to the cover plate 19. An O-ring 58 around the periphery of the seal housing 55 provides a seal between the ring housing 48 and the seal housing 55 in the event sausage batter enters the area between the seal housing and the emulsifying chamber cover plate 19.

The rotor assembly is driven through a drive shaft 16. The upper penultimate section 59 of the drive shaft 16 is square, with the upper end of the shaft terminating in a threaded projection 60. The square shaft section 59 mates with a square hole in the drive disk 41 for the positive driving thereof. A nut 61 and a washer 62 serve to maintain the drive disk 41 seated against a shoulder 64 of the drive shaft 16. The drive shaft 16 is journaled in bearings 65 and 66 and mounted in a housing 68 depending from the drive disk housing 39. A seal 69 cooperates with a sleeve 70 on the shaft to isolate the emulsifying chamber from the bearings. As explained above, rotational energy is imparted to the drive shaft 16 through the driving of a pulley 71 mounted thereto with belting 72, which is in turn driven by a motor 15 and an associated pulley 74 (See FIG. 1)

I claim as my invention:

1. An apparatus for emulsifying sausage batter or the like comprising in combination:

an enclosed cylindrical emulsifying chamber, said chamber having an axial inlet at the top thereof, said chamber further having a discharge conduit, said discharge conduit being arranged perpendicular to the axis of said chamber at the bottom and tangential to the periphery thereof, a rotatable drive shaft means arranged coaxial with and passing through the bottom of said emulsified chamber;

a plurality of spaced alternating rotatable and nonrotatable perforate rings, the uppermost and lowermost of said rings being rotatable, said rotatable rings being driven by said drive shaft means;

means within said chamber disposed above and rotatable with the uppermost of said rings to impart rotational movement to and impel said sausage batter from said axial inlet outward and vertically downward into the openings of said uppermost rotating ring; and means within said chamber disposed beneath and rotatable with the lowermost of said rings to receive the sausage batter directly as it exits vertically downward from said rotating lowermost ring and to maintain the rotational movement of said sausage batter as said means directs the sausage batter into said discharge conduit.

2. An apparatus as set forth in claim 1 wherein said means disposed above the uppermost of said rings comprises a feed impeller, said feed impeller being driven by said drive shaft means and serving to impel the sausage batter radially outward from said axial inlet toward the perforations in the uppermost of said rings and a feed ring, said feed ring being driven by said drive shaft means and serving to direct the batter flowing radially outward from said feed impeller vertically downward into the perforations in said uppermost ring.

3. An apparatus as set forth in claim 2 wherein said feed ring has an annular pocket formed by an upper surface and a radially sloping peripheral surface, said annular pocket serving to centrifugally remove impurities from the sausage batter before it enters the perforations in said uppermost ring.

4. An apparatus as set forth in claim 1 wherein said means disposed beneath the lowermost of said rings comprises a drive disk, said drive disk being driven by said drive shaft means and having blades which receive the batter from the lowermost of said rings and direct the batter into said discharge conduit.

* * * * *